United States Patent [19]
Pearlstine

[11] Patent Number: 5,969,033
[45] Date of Patent: Oct. 19, 1999

[54] POLYMER/DYE REACTION PRODUCTS FOR IMPROVED CHROMA IN PIGMENT-BASED INK JET INKS

[75] Inventor: Kathryn Amy Pearlstine, Wilmington, Del.

[73] Assignee: E. I. du Pont de Nemours and Company, Wilmington, Del.

[21] Appl. No.: 08/986,548

[22] Filed: Dec. 8, 1997

[51] Int. Cl.⁶ .................................................. C08L 29/04
[52] U.S. Cl. ......................... 524/502; 524/504; 524/505; 524/513; 106/23
[58] Field of Search ............................... 106/23; 524/502, 524/504, 505, 513

[56] References Cited

U.S. PATENT DOCUMENTS

| | | | |
|---|---|---|---|
| 4,680,332 | 7/1987 | Hair et al. ................................ | 524/377 |
| 4,692,188 | 9/1987 | Ober et al. ................................ | 106/23 |
| 4,877,451 | 10/1989 | Winnik et al. ............................ | 106/23 |
| 4,945,121 | 7/1990 | Micale et al. ........................... | 523/339 |
| 5,145,518 | 9/1992 | Winnik et al. ............................ | 106/21 |
| 5,250,107 | 10/1993 | Bares .................................... | 106/20 R |

FOREIGN PATENT DOCUMENTS

| | | |
|---|---|---|
| 0 371 627 | of 0000 | European Pat. Off. . |
| 0 732 382 | of 0000 | European Pat. Off. . |
| 0 799 870 | of 0000 | European Pat. Off. . |
| 0 656 406 A2 | 6/1995 | European Pat. Off. ........ C09D 11/00 |
| WO 93/23795 | of 0000 | WIPO . |

*Primary Examiner*—Kriellion Sanders
*Attorney, Agent, or Firm*—Joseph A. Tessari

[57] ABSTRACT

Aqueous ink jet inks with improved water fastness, smear fastness and improved chroma comprise an aqueous vehicle; a polymeric dispersant; and an insoluble colorant comprising an organic pigment having adsorbed thereon a dye/polymer complex.

12 Claims, No Drawings

POLYMER/DYE REACTION PRODUCTS FOR IMPROVED CHROMA IN PIGMENT-BASED INK JET INKS

BACKGROUND OF THE INVENTION

This invention relates to aqueous ink jet inks and more particularly, aqueous inks containing polymer/dye reaction product and having improved chroma.

Ink jet printing is a non-impact method for recording information in response to an electronic signal, such as that generated by a computer. It has become increasingly popular, particularly for so-called "desk-top publishing", because of its capability to produce small volumes of printed matter from digital input, at high throughput speeds with reliability, relatively quiet operation, good print quality, and at low cost. In the printer, the electronic signal produces droplets of ink that are deposited on a substrate such as paper or transparent film. Thermal or bubble jet drop-on-demand printers have been especially successful and have found broad application as output devices for personal computers in the office and the home.

Both dyes and pigments have been used as ink colorants for ink jet printers. However, dye-based inks have several disadvantages as compared to pigment-based inks. They are usually very water soluble and remain so after drying on the substrate. They are easily re-dissolved by contact with water and will run when exposed to a water spill. Also, dye images smear on contact with felt pen markers. In addition, they exhibit poor light stability relative to pigments and are known to fade even under conditions of office fluorescent lighting. Thus, dye-based ink jet inks are often unsuitable for use in applications requiring moisture resistance and greater light stability.

Pigments, however, provide improved water and smear resistance and improved light stability. However, they do not have the required chroma that is one of the major advantages of using dyes.

Thus, there is a need for improved inks that have good water and smear resistance, improved light stability and also good chroma.

SUMMARY OF THE INVENTION

The invention provides an ink jet ink comprising:
(a) an aqueous vehicle;
(b) an insoluble colorant comprising an organic pigment having adsorbed thereon a dye/polymer reaction product; and
(c) a polymeric dispersant.

DETAILED DESCRIPTION OF THE INVENTION

The invention provides an ink jet ink composition which is particularly suited for use in ink jet printers in general, and thermal printers in particular. Essentially, the ink composition comprises an aqueous vehicle, an insoluble colorant comprising an organic pigment having adsorbed thereon a dye/polymer reaction product; and a polymeric dispersant.

Aqueous Vehicle

The aqueous vehicle its water or a mixture of water and at least one water soluble organic solvent. Selection of a suitable mixture depends on requirements of the specific application, such as desired surface tension and viscosity, the selected colorant, drying time of the ink, and the type of substrate onto which the ink will be printed. Representative examples of suitable water-soluble organic solvents are disclosed in U.S. Pat. No. 5,085,698. A mixture of water and diethylene glycol or a nitrogen containing cyclic compound, such as 2-pyrrolidone, is preferred as the aqueous vehicle.

In the case of a mixture of water and a water-soluble solvent, the aqueous vehicle usually contains from about 30% to about 95% water with the balance (i.e., 70 to 5%) being the water-soluble solvent. The preferred compositions are approximately 60% to about 95% water, based on the total weight of the aqueous vehicle.

The amount of aqueous vehicle in the ink is in the range of approximately 70 to 99.8%, preferably approximately 94 to 99.8%, based on total weight of the ink when an organic pigment is selected; approximately 25 to 99.8%, preferably approximately 70 to 99.8% when an inorganic pigment is selected; and 80 to 99.8% when a dye is selected.

Colorant

The colorant is insoluble in the aqueous vehicle and comprises an organic pigment having adsorbed thereon a dye/polymer reaction product. Preferably, the dye/polymer reaction product is insoluble in the aqueous vehicle.

The pigments are insoluble in the aqueous vehicle. Useful pigments include a variety of organic pigments, alone or in combination, that are typically employed as colorants in ink compositions. The pigment particles are sufficiently small to permit free flow of the ink through the ink jet printing device, especially at the ejecting nozzles that usually have a diameter ranging from 10 micron to 50 micron. The particle size also has an influence on the pigment dispersion stability, which is critical throughout the life of the ink. Brownian motion of minute particles will help prevent the particles from settling. It is also desirable to use small particles for maximum color strength. The typical range of useful particle size is approximately 0.005 micron to 15 micron. Preferably, the pigment particle size should range from 0.005 to 5 micron and most preferably, from 0.01 to 0.3 micron.

The selected pigment may be used in dry or wet form. For example, pigments are usually manufactured in aqueous media and the resulting pigment is obtained as water wet presscake. In presscake form, the pigment is not aggregated to the extent that it is in dry form. Thus, pigments in water wet presscake form do not require as much deaggregation in the process of preparing the inks from dry pigments. Representative commercial dry and presscake pigments that may be used in practicing the invention are disclosed in the aforementioned U.S. Pat. No. 5,085,698.

The ink may contain up to approximately 30% pigment by weight for some applications, but will generally be in the range of 0.1 to 15%, preferably 0.1 to 8%, by weight of the total ink composition.

The dye/polymer reaction product are prepared by dissolving a polymer and dye in a common solvent and mixing to react. Complexes may be formed, for example, by acid-base reaction, formation of a charge complex between the polymer and the dye, or by reaction to form a covalent attachment between the polymer and the dye. The polymer/dye reaction product may precipitate from the solvent to form an insoluble reaction product or may remain soluble. Examples of useful reactions to form the dye/polymer reaction product include: reaction of an amine group on the polymer with a sulfonic acid or sulfonate group of the dye; reaction of a sulfonate or sulfonic acid containing polymer with a basic dye containing an amine group; reaction of hydroxyl containing polymers by reactive dyes.

The dyes useful in preparing the dye/polymer reaction product may be anionic, cationic, amphoteric or non-ionic. Such dyes are well known in the art. Anionic dyes yield colored anions, and cationic dyes yield colored cations in aqueous solution. Typical anionic dyes contain carboxylic or sulfonic acid groups as the ionic moiety and encompass all acid dyes. Cationic dyes usually contain quaternary nitrogen groups, and encompass all basic dyes.

Anionic dyes most useful in this invention are Acid, Direct, Food, Mordant, and Reactive dyes. Anionic dyes typically are nitroso compounds, nitro compounds, azo compounds, stilbene compounds, triarylmethane compounds, xanthene compounds, quinoline compounds, thiazole compounds, azine compounds, oxazine compounds, thiazine compounds, aminoketone compounds, anthraquinone compounds, indigoid compounds or phthalocyanine compounds.

Cationic dyes most useful in this invention are the basic dyes and mordant dyes designed to bind acidic sites on a substrate, such as fibers. Useful types of such dyes include the azo compounds, diphenylmethane compounds, triarylmethanes, xanthene compounds, acridine compounds, quinoline compounds, methine or polymethine compounds, thiazole compounds, indamine or indophenyl compounds, azine compounds, oxazine compounds, and thiazine compounds, among others, all of which are well known in the art.

The color and amount of dye used in the dye/polymer reaction product is largely a function of choice, being primarily dependent upon the desired color of the print achieved with the ink, the purity of the dye and its strength. Low concentrations of dye may not give adequate color vividness. High concentrations may result in poor printhead performance or unacceptably dark colors. The dye is present in the amount of 0.01 to 20%, preferably 0.05 to 8%, and most preferably 0.1 to 2%, by weight, based on the total weight of the ink.

Polymers useful in preparing the dye/polymer reaction product include polymers containing hydroxy, amine, sulfonate, or sulfonic acid groups. Some examples are poly(styrene sulfonate, sodium salt), poly(styrene sulfonic acid), poly(styrene sulfonic acid/maleic anhydride), poly(2-acrylamido-2-methyl-propane sulfonic acid/acrylic acid/ methyl acrylate/benzyl methacrylate/ETEGMA), poly (styrene/dimethylamino ethylmethacrylate/ hydroxyethylacrylate), poly(benzyl methacrylate/ hydroxyethyl acrylate), poly (benzyl methacrylate/dimethyl amino ethylmethacrylate).

The dye/polymer reaction product is present in the amount of 0.02 to 40%, and more preferably 0.2 to 4%, by weight, based on the total weight of the ink.

The dye/polymer reaction product is further blended with the pigment to form a pigment/dye/polymer colorant which is insoluble in the ink vehicle.

Dispersants

Dispersants, preferably polymeric dispersants are used to disperse the colorant. Particularly preferred polymeric dispersants are the structured polymers; that is, block polymers, branched polymers and graft polymers.

Useful block polymers include AB and BAB block copolymers which are disclosed in U.S. Pat. No. 5,085,698 and ABC triblock copolymers disclosed in U.S. Pat. No. 5,519,085. Some suitable graft polymers are disclosed in U.S. Pat. No. 5,231,131.

Although random copolymers can be used as dispersing agents, they generally are not as effective in stabilizing pigment dispersions as the block polymers, and therefore are not preferred. Random interpolymers having narrowly controlled molecular weight ranges, preferably having poly dispersivities of 1–3, may be selected. These polymers are substantially free of higher molecular weight species that readily plug pen nozzles. Number average molecular weight must be less than 10,000 Daltons, preferably less than 6,000, most preferably less than 3,000. These random polymers contain random hydrophobic and hydrophilic monomer units. Commercial random dispersant polymers will plug pen nozzles readily. The needed molecular weight control can be obtained by using the Group Transfer Polymerization technique, but other methods that deliver low dispersivity also may be employed.

Some examples of hydrophobic monomers used in random polymers are methyl methacrylate, n-butyl methacrylate, 2-ethylhexyl methacrylate, benzyl methacrylate, 2-phenylethyl methacrylate and the corresponding acrylates. Examples of hydrophilic monomers are methacrylic acid, acrylic acid, dimethylaminoethyl [meth] acrylate and salts thereof. Also quaternary salts of dimethylaminoethyl [meth]acrylate may be employed.

Other Ingredients

The ink compositions may also contain additives that are commonly employed in ink jet inks, such as biocides to inhibit growth of microorganisms, sequestering agents to eliminate deleterious effects of heavy metal impurities, humectants, viscosity modifiers and polymers also may be included to improve various properties of the ink compositions as is known in the art.

The ink compositions are prepared in the same manner as other ink jet ink compositions. The dispersion may be prepared by premixing the selected pigment(s) and dye/ polymer reaction product with suitable solvents and dispersing the colorant in the aqueous vehicle with the polymeric dispersant. The dispersion step may be accomplished in a horizontal mini mill, a ball mill, an attritor, a 2-roll mill, or by passing the mixture through a plurality of nozzles within a liquid jet interaction chamber at a liquid pressure of at least 5000 psi to produce a uniform dispersion of the colorant particles in the aqueous vehicle. Additional cosolvents may be present during the dispersion step.

Ink Properties

Jet velocity, separation length of the droplets, drop size and stream stability are greatly affected by the surface tension and the viscosity of the ink. Pigmented ink jet inks suitable for use with ink jet printing systems typically have a viscosity no greater than 20 cP, and preferably in the range of about 1.0 cP to about 10.0 cP at 20° C. The ink has physical properties compatible with a wide range of ejecting conditions, i.e., driving voltage and pulse width for thermal ink jet printing devices, driving frequency of the piezo element for either a drop-on-demand device or a continuous device, and the shape and size of the nozzle. The inks have excellent storage stability for a long period and do not clog in an ink jet apparatus. Fixing of the ink on the image recording material, such as, paper, fabric, film, etc., can be carried out speedily and surely. The printed ink images have clear color tones, high density, excellent water resistance and light fastness. Further, the ink does not corrode parts of the ink jet printing device it comes in contact with, and it is essentially odorless, and non-toxic.

EXAMPLES

The following examples, wherein parts and percentages are by weight, illustrate but do not limit the invention.

| Glossary: | |
| --- | --- |
| BZMA | benzyl methacrylate |
| MAA | methacrylic acid |
| ETEGMA | ethoxytriethylene glycol methacrylate |
| MEK | methyl ethyl kettone |
| AMPS | 2-acrylamido-2-methylpropane sulfonic acid |
| AA | acrylic acid |
| MA | methyl acrylate |

Polymer 1 BZMA/MAA 13//10 AB block copolymer.

A 12-liter flask was equipped with a mechanical stirrer, thermometer, N2 inlet, drying tube outlet, and addition funnels. Tetrahydrofuran THF, 3750 gm, and p-xylene, 7.4 gm, were charged to the flask. The catalyst, tetrabutyl ammonium m-chlorobenzoate, 3.0 ml of a 1.0 M solution in acetonitrile, was then added. Initiator, 1,1-bis (trimethylsiloxy)-2-methyl propene, 291.1 gm (1.25 M) was injected. Feed I [tetrabutyl ammonium m-chlorobenzoate, 3.0 ml of a 1.0 M solution in acetonitrile] was started and added over 180 minutes. Feed II [trimethylsilyl methacrylate, 1975 gm (12.5 M)] was started at 0.0 minutes and added over 35 minutes. One hundred minutes after Feed II was completed (over 99% of the monomers had reacted), Feed III [benzyl methacrylate, 2860 gm (16.3 M) was started and added over 30 minutes. At 400 minutes, 720 gm of methanol were added to the above solution and distillation begun. During the first stage of distillation, 1764.0 gm of material were removed. Then an additional 304.0 gm of methanol was added and an additional 2255.0 gm of material were distilled out. The resulting solution was at 49.7% solids and the polymer had a number average molecular weight of Mn=3,200.

Polymer 2: AMPS/AA/MA//-g-BZMA/ETEGMA10/10/50//-g-18/12 graft copolymer

A BZMA/ETEGMA/MAA 60/40 macromonomer was prepared by charging 324 g BzMA, 216 g ETEGMA, 630 g methyl ethyl ketone (MEK) and 0.1640 g Diaquabis (borondifluorodiphenyl-glyoximato) cobalt(II), Co(DPG-BF2) to a 5-liter flask, equipped with a mechanical stirrer, thermometer, N2 inlet and addition funnels. The reaction mixture was heated to the reflux temperature (88° C.) and 5.4 g of VAZO® 52 dissolved in 54 g of MEK was fed over 15 min. After addition was complete an additional 16.2 g of VAZO® 52 dissolved in 46 g of MEK together with the monomer mixture of 756 g of BzMA and 504 g of ETEGMA was fed in over 240 min. The reaction was finished off by addition of 5.4 g of Vazo® 52 dissolved in 26 g of MEK and the reflux was maintained for an additional 60 minutes. The reaction mixture had nominal 65% solids.

To a 2-liter flask, equipped with a mechanical stirrer, thermometer, N2 inlet and addition funnels, was charged 230.8 g of macromonomer solution (above) and 355 g methanol. The solution was heated to reflux (66° C.). A solution of 2.5 g VAZO® 52 dissolved in 5 g MEK was added in one shot. Then a mixture of: (1) 250 g methyl acrylate (MA) and 50 g acrylic acid (AA), (2) 50 g 2-acrylamido-2-methylpropane sulfonic acid (AMPS) dissolved in 70 g 2-pyrrolidone and 70 g methanol, and (3) 12.5 g VAZO® 52 dissolved in 25 g MEK was fed in over 180 min. After addition was complete, an additional 2.5 g VAZO® 52 dissolved in 5 g MEK were added in one shot. The reaction mixture was kept at the reflux temperature for an additional 60 minutes. The resulting polymer solution was then neutralized to 100% with 30.06 g of a 45% solution of KOH in water. The final polymer solution was 51.2% solids.

Polymer 3: BZMA/DMAEMA/ETEGMA 15//30/8 AB block copolymer.

A 12-liter flask was equipped with a mechanical stirrer, thermometer, N2 inlet, drying tube outlet, and addition funnels. Tetrahydrofuran THF, 4035 gm, and p-xylene, 13.0 gm, were charged to the flask. The catalyst, tetrabutyl ammonium m-chlorobenzoate, 2.4 ml of a 1.0 M solution in acetonitrile, was then added. Initiator, 1-methoxy-1-trimethylsiloxy-2-methyl propene, 84.7 gm (0.487 M) was injected. Feed I [2-dimethylaminoethyl methacrylate DMAEMA, 2278 gm (14.5 M) and ethoxytriethyleneglycol methacrylate ETEGMA, 949.2 (3.86 M)] was started at 0.0 minutes and added over 60 minutes. One hundred minutes after Feed I was completed (over 99% of the monomers had reacted), Feed II [benzyl methacrylate, 1275 gm (7.24 M) was started and added over 40 minutes. The solution was at 65.2% solids and the polymer had a number average molecular weight of 9,350. 281.6 grams of 2-pyrrolidone were added to 250.9 grams of polymer solution in THF. The THF was distilled off leaving 34.7% solids in 2-pyrrolidone.

Dye/Polymer Reaction Product 1:

The following ingredients were mixed together and stirred:

| Ingredient | Amount (g) |
| --- | --- |
| Polymer 2 | 391.2 |
| Basozol ® Red 71LS (40% solids), (BASF) | 116.0 |
| Deionized water | 1556.0 |

A precipitate of dye and polymer formed. The precipitate was rinsed and collected. This gave 250 g of material with a measured percent solids of 70%.

Dye/Polymer Reaction Product 2:

The following ingredients were mixed together and stirred:

| Ingredient | Amount (g) |
| --- | --- |
| Polymer 3 | 194.0 |
| Acid Red 52 dye (3.55% dye), (BASF) | 700 |

The solution was mixed overnight.

Colorant 1:

The following ingredients were blended together and milled on a two-roll mill for 30 minutes:

| Ingredient | Amount (g) |
| --- | --- |
| Dye/Polymer Reaction Product 1 | 79.9 |
| Sunfast ® Red 122, Sun Chemical Corporation, Cincinnati, OH | 112.0 |
| 2-Pyrrolidone | 25.0 |
| Isopropylalcohol | 60.0 |

The colorant produced was mixed with 148.4 g of Polymer 1 and milled for an additional 30 minutes. 109 grams of this material was combined with 11.3 grams 45.5% KOH solution and 479.7 grams DI water and dissolved with adequate stirring. This gave a dispersion ("Dispersion 1") that was 18.4% solids and comprised 8% pigment, 5.4% dispersant, and 4% dye/polymer reaction product.

Colorant 2:

The following ingredients were blended together in a high speed disperser. The pH of the mixture was adjusted to 8.0 with KOH.

| Ingredient | Amount (g) |
| --- | --- |
| Dye/Polymer Reaction Product 2 | 894.0 |
| Sunfast ® Red 122 presscake, (49% solids) Sun Chemical Corporation, Cincinnati, OH | 254.0 |
| Surfynol ® 440 (Air Products and Chemicals, Inc., Allentown, PA) | 0.3 |
| Deionized water | 200.0 |

The precipitate was collected, rinsed and dried. 120 grams of the colorant so produced were mixed with 98 g of Polymer 1 and 35 grams of diethylene and the mixture was milled for an additional 30 minutes. 136.4 grams of this material was combined with 12.6 grams 45.5% KOH solution and 351 grams DI water and dissolved with adequate stirring. This gave a dispersion ("Dispersion 2") that was 18.4% solids and comprised 9% pigment, 6.7% dispersant, and 6.9% dye/polymer reaction product.

Example 1

An ink was prepared by mixing together the following ingredients:

| Ingredient | Amount (g) |
| --- | --- |
| Dispersion 1 | 30.0 |
| 2-Pyrrolidone | 2.4 |
| Liponics ® EG-1 (Lipo Chemicals Co., Paterson, NJ) | 1.2 |
| Hexylene glycol | 6.0 |
| DI water | 20.4 |

The ink was printed with a Hewlett-Packard 1200C printer (Hewlett-Packard Co., Palo Alto, Calif.), by refilling the ink in the black pen and comparing it to an ink containing no dye/polymer reaction product (Control #1). The inks were printed on Champion Datacopy (Champion International Corporation, Stamford, Conn.) and Hammermill Gilbert bond paper (Mead Company, Dayton, Ohio). The water fastness was measured by printing a series of five lines, each line ¼" wide and spaced ¼" apart. Fifteen minutes after printing, a milliliter of water was dripped above the test pattern with the paper held at a 45° angle. The optical density of the runoff was measured between the 3rd and 4th lines.

| Ink | Paper | Chroma | Drip Test |
| --- | --- | --- | --- |
| Example 1 | Hammermill Gilbert Bond | 64.0 | 0.043 |
|  | Champion Datacopy | 58.3 |  |
| Control 1 | Hammermill Gilbert Bond | 60.6 | 0.282 |
|  | Champion Datacopy | 50.3 |  |

Example 2

An ink was prepared by mixing together the following ingredients:

| Ingredient | Amount (g) |
| --- | --- |
| Dispersion 2 | 20.0 |
| Liponics ® EG-1 | 6.0 |
| Diethylene glycol | 5.0 |
| Surfynol ® 465 | 0.2 |
| DI water | 68.8 |

The ink contained 1.8% pigment and 0.4% dye as colorant.

Two other inks were made as controls. Control #2 is an ink containing 1.8% pigment as colorant with no dye/polymer reaction product. Control #3 contains 1.8% pigment and 0.4% dye as colorant. The dye is added in solution. There is no dye/polymer reaction product.

The ink was printed with a Hewlett-Packard 1200C printer by refilling the ink in the black pen and comparing it to Control inks #2 and #3. The inks were printed on Champion Data Copy paper. The water fastness was measured by the drip test described above.

| Ink | Chroma | Drip test |
| --- | --- | --- |
| Example 2 | 56 | 0.110 |
| Control 2 | 50 | 0.250 |
| Control 3 | 67 | 0.250 |

What is claimed is:

1. An ink jet ink comprising:
   (a) an aqueous vehicle;
   (b) an insoluble colorant comprising an organic pigment having adsorbed thereon a dye/polymer reaction product; and
   (c) a polymeric dispersant.

2. The ink of claim 1 wherein the dye is covalently bound to the polymer.

3. The ink of claim 1 wherein the dye is ionically bound to the polymer.

4. The ink of claim 1 wherein the dye/polymer reaction product is insoluble in the aqueous vehicle.

5. The ink of claim 1 wherein the pigment is present in the amount of 0.1 to 15% by weight, based on the weight of the total ink composition.

6. The ink of claim 1 wherein the dye/polymer reaction product is present in the amount of 0.02 to 40% by weight based on the weight of the colorant.

7. The ink of claim 1 wherein the dye/polymer complex is prepared from polymers containing moieties selected from hydroxy, amine, sulfonate and sulfonic acid.

8. The ink of claim 7 wherein the polymer is selected from the group consisting of poly(styrene sulfonate, sodium salt), poly(styrene sulfonic acid), poly(styrene sulfonic acid/maleic anhydride), poly(2-acrylamido-2-methylpropane sulfonic acid/acrylic acid/methyl acrylate/benzyl methacrylate/ETEGMA), poly(styrene/dimethylamino ethylmethacrylate/hydroxyethylacrylate), poly(benzyl methacrylate/hydroxyethyl acrylate) and poly (benzyl methacrylate/dimethyl amino ethylmethacrylate).

9. The ink of claim 1 wherein the polymeric dispersant is a structured polymer.

10. The ink of claim 9 wherein the polymeric dispersant is a block polymer.

11. The ink of claim 9 wherein the polymeric dispersant is a graft polymer.

12. The ink of claim 1 wherein the aqueous vehicle is a mixture of water and at least one water soluble organic solvent.

* * * * *